(12) United States Patent
Chon

(10) Patent No.: US 8,197,184 B2
(45) Date of Patent: Jun. 12, 2012

(54) VANE WITH ENHANCED HEAT TRANSFER

(75) Inventor: Young H. Chon, Farmington, CT (US)

(73) Assignee: United Technologies Corporation, Hartford, CT (US)

( * ) Notice: Subject to any disclaimer, the term of this patent is extended or adjusted under 35 U.S.C. 154(b) by 758 days.

(21) Appl. No.: 11/582,594

(22) Filed: Oct. 18, 2006

(65) Prior Publication Data

US 2008/0095635 A1    Apr. 24, 2008

(51) Int. Cl.
F01D 9/00 (2006.01)
F01D 9/06 (2006.01)
F01D 9/04 (2006.01)

(52) U.S. Cl. .................. 415/115; 415/191; 415/211.2

(58) Field of Classification Search .............. 415/115, 415/191, 211.2; 416/97 R, 241 R
See application file for complete search history.

(56) References Cited

U.S. PATENT DOCUMENTS

| | | | |
|---|---|---|---|
| 5,225,246 A * | 7/1993 | Beers et al. ................. 427/252 |
| 5,344,283 A | 9/1994 | Magowan et al. |
| 5,413,458 A | 5/1995 | Calderbank |
| 5,516,260 A * | 5/1996 | Damlis et al. ................ 415/115 |
| 5,683,226 A * | 11/1997 | Clark et al. ................... 415/200 |
| 6,077,036 A * | 6/2000 | Heffron et al. ............... 415/115 |
| 6,254,334 B1 * | 7/2001 | LaFleur ........................ 415/115 |
| 6,296,447 B1 * | 10/2001 | Rigney et al. ............. 416/241 R |
| 6,345,955 B1 * | 2/2002 | Heffron et al. ............... 415/115 |
| 6,364,608 B1 * | 4/2002 | Brainch et al. ............. 416/97 R |
| 6,379,118 B2 * | 4/2002 | Lutum et al. ............... 416/97 R |
| 6,402,470 B1 * | 6/2002 | Kvasnak et al. ............ 416/97 R |
| 6,514,042 B2 * | 2/2003 | Kvasnak et al. ............ 416/97 R |
| 6,533,547 B2 * | 3/2003 | Anding et al. .............. 416/97 R |
| 6,705,836 B2 * | 3/2004 | Bourriaud et al. .......... 416/97 R |
| 6,773,230 B2 * | 8/2004 | Bather et al. ............... 416/97 R |
| 6,860,718 B2 * | 3/2005 | Suzuki et al. .............. 415/173.5 |
| 6,929,054 B2 * | 8/2005 | Beals et al. .................... 164/369 |
| 7,008,178 B2 * | 3/2006 | Busch et al. .................. 415/115 |
| 7,033,136 B2 * | 4/2006 | Botrel et al. .................. 415/115 |
| 7,097,425 B2 * | 8/2006 | Cunha et al. ............... 416/97 R |
| 7,131,818 B2 * | 11/2006 | Cunha et al. ............... 416/97 R |
| 7,207,374 B2 * | 4/2007 | Persky et al. ................. 164/369 |
| 2004/0180232 A1 * | 9/2004 | Das et al. ...................... 428/610 |
| 2005/0135923 A1 | 6/2005 | Coons et al. |
| 2006/0093480 A1 | 5/2006 | Cunha et al. |

FOREIGN PATENT DOCUMENTS

JP    2005201257 A    7/2005

\* cited by examiner

*Primary Examiner* — Edward Look
*Assistant Examiner* — Sean J Younger
(74) *Attorney, Agent, or Firm* — Bachman & LaPointe, P.C.

(57) ABSTRACT

A vane cluster has a coated metallic substrate. The cluster includes a platform and a shroud. At least first and second airfoils extend between an outer face of the platform and an inner face of the shroud. Each airfoil has a pressure side and a suction side. The pressure side of the first airfoil faces the suction side of the second airfoil. The cluster includes a cooling passageway system including one or more first feed passageways in the first airfoil and one or more second feed passageways in the second airfoil. At least a first side selected from the pressure side of the first airfoil and the suction side of the second airfoil includes a first region with a local thinning or gap in the coating. Along the first side, the cooling passageway system includes means for locally cooling said first region.

20 Claims, 11 Drawing Sheets

VANE WITH ENHANCED HEAT TRANSFER

U.S. GOVERNMENT RIGHTS

The invention was made with U.S. Government support under contract N00019-02-C-3003 awarded by the U.S. Navy. The U.S. Government has certain rights in the invention.

BACKGROUND OF THE INVENTION

The invention relates to cooling of high temperature components. More particularly, the invention relates to coated gas turbine engine vane clusters.

In the aerospace industry, a well-developed art exists regarding the cooling of components such as gas turbine engine components. Exemplary components are gas turbine engine blades and vanes. Exemplary blades and vanes airfoils are cooled by airflow directed through the airfoil to be discharged from cooling holes in the airfoil surface. Also, there may be cooling holes along the vane shroud or vane or blade platform. The cooling mechanisms may include both direct cooling as the airflow passes through the component and film cooling after the airflow has been discharged from the component but passes downstream close to the component exterior surface.

By way of example, cooled vanes are found in U.S. Pat. Nos. 5,413,458 and 5,344,283 and U.S. Application Publication 20050135923. Vane clustering may have several advantages. The reduced engine part count may ease manufacturing and reduce weight. The reduction in the number of platform and shroud gaps (e.g., a halving with doublets) may have performance advantages. First, intergap leakage may correspondingly be reduced. Second, diversion of cooling air to cool gap seals may also be reduced.

Exemplary cooled vanes are formed by an investment casting process. A sacrificial material (e.g., wax) is molded over one or more cores (e.g., refractory metal cores and/or ceramic cores) to form a pattern. The pattern is shelled. The shell is dewaxed. Alloy (e.g., nickel- or cobalt-based superalloy) is cast in the shell. The shell and core(s) may be destructively removed (e.g., by mechanical means and chemical means, respectively). The casting may be finish machined (including surface machining and drilling of holes/passageways). The casting may be coated with a thermal and/or erosion-resistant coating.

Exemplary thermal barrier coatings include two-layer thermal barrier coating systems An exemplary system includes an NiCoCrAlY bond coat (e.g., low pressure plasma sprayed (LPPS)) and a yttria-stabilized zirconia (YSZ) barrier coat (e.g., air plasma sprayed (APS) or electron beam physical vapor deposited (EBPVD)). With vane clusters (e.g., doublets), each airfoil may interfere with the application of the coating to the adjacent airfoil(s). This may cause local thinning of the applied coating or even gaps.

SUMMARY OF THE INVENTION

One aspect of the invention involves a vane cluster having a coated metallic substrate. The cluster includes a platform and a shroud. At least first and second airfoils extend between an outer face of the platform and an inner face of the shroud. Each airfoil has a pressure side and a suction side. The pressure side of the first airfoil faces the suction side of the second airfoil. The cluster includes a cooling passageway system including one or more first feed passageways in the first airfoil and one or more second feed passageways in the second airfoil. At least a first side selected from the pressure side of the first airfoil and the suction side of the second airfoil includes a first region with a local thinning or gap in the coating. Along the first side, the cooling passageway system includes means for locally cooling said first region.

In various implementations, the means may be provided in a reengineering of an existing cluster configuration. The means may include an in-wall circuit. This circuit may direct flow from the shroud to the platform.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
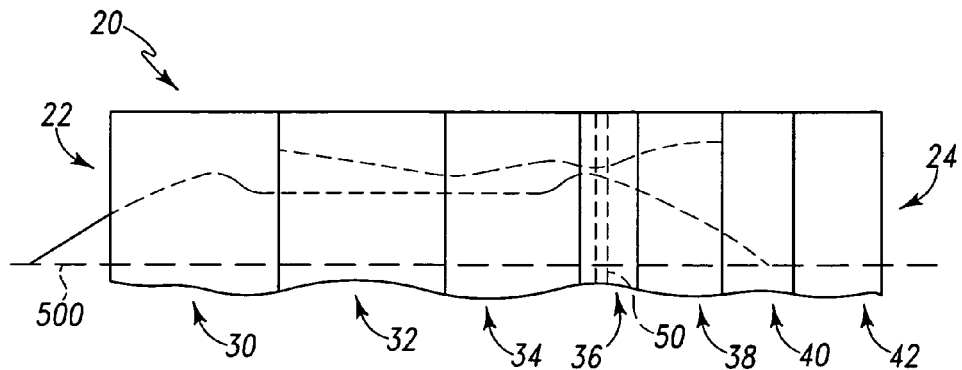
FIG. 1 is a schematic view of a gas turbine engine.

FIG. 1 shows a gas turbine engine 20 having a central longitudinal axis 500 and extending from an upstream inlet 22 to a downstream outlet 24. From upstream to downstream, the engine may have a number of sections along a core flowpath. From upstream to downstream, the sections may include a low speed/pressure compressor (LPC) 30, a high speed/pressure compressor (HPC) 32, a combustor 34, a high speed/pressure turbine (HPT) 36, a low speed/pressure turbine (LPT) 38, an augmentor 40, and an exhaust duct/nozzle 42. Each of the compressor and turbine sections may include a number of blade stages interspersed with a number of vane stages. The blades of the LPC and LPT are mounted on a low speed spool for rotation about the axis 500. The blades of the HPC and HPT are mounted on a high speed spool for such rotation.

Figure 2:
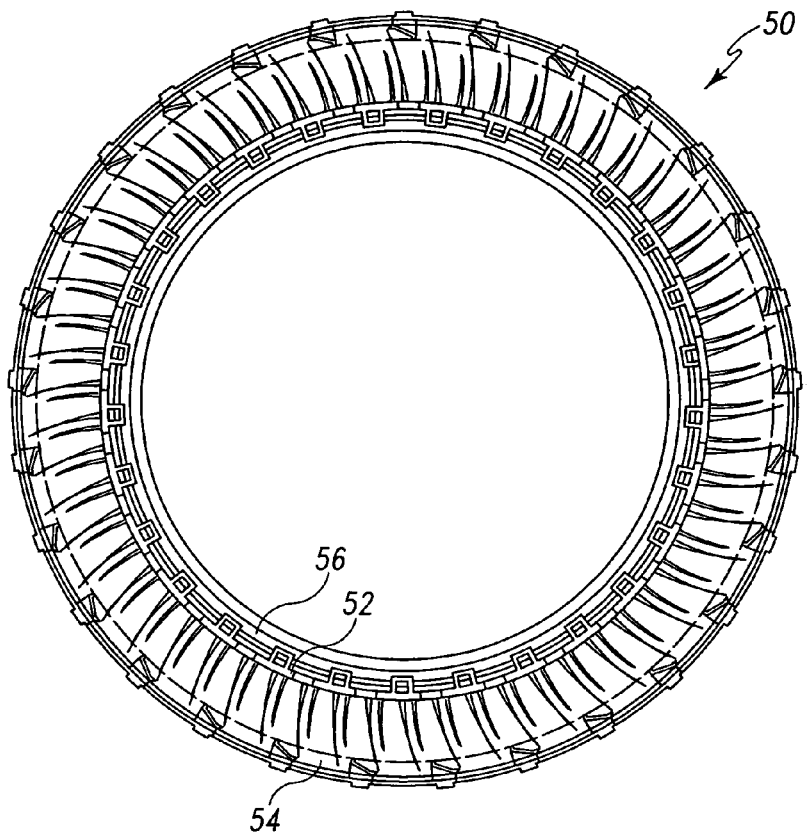
FIG. 2 is a view of a vane ring of the engine of FIG. 1.

As is discussed in further detail below, one or more of the vane stages may be formed as a cluster ring. For example, a second vane stage 50 of the HPT 36 is schematically shown in FIG. 1. FIG. 2 shows further details of the exemplary vane stage 50. The ring includes an inboard platform 52 and an outboard shroud 54. A circumferential array of airfoils (discussed below) span between the platform and shroud. As is discussed in further detail below, the ring may be segmented into a plurality of separately-formed clusters interlocked at the platforms by a structural ring 56 and at the shrouds by an engine case.

Figure 3:
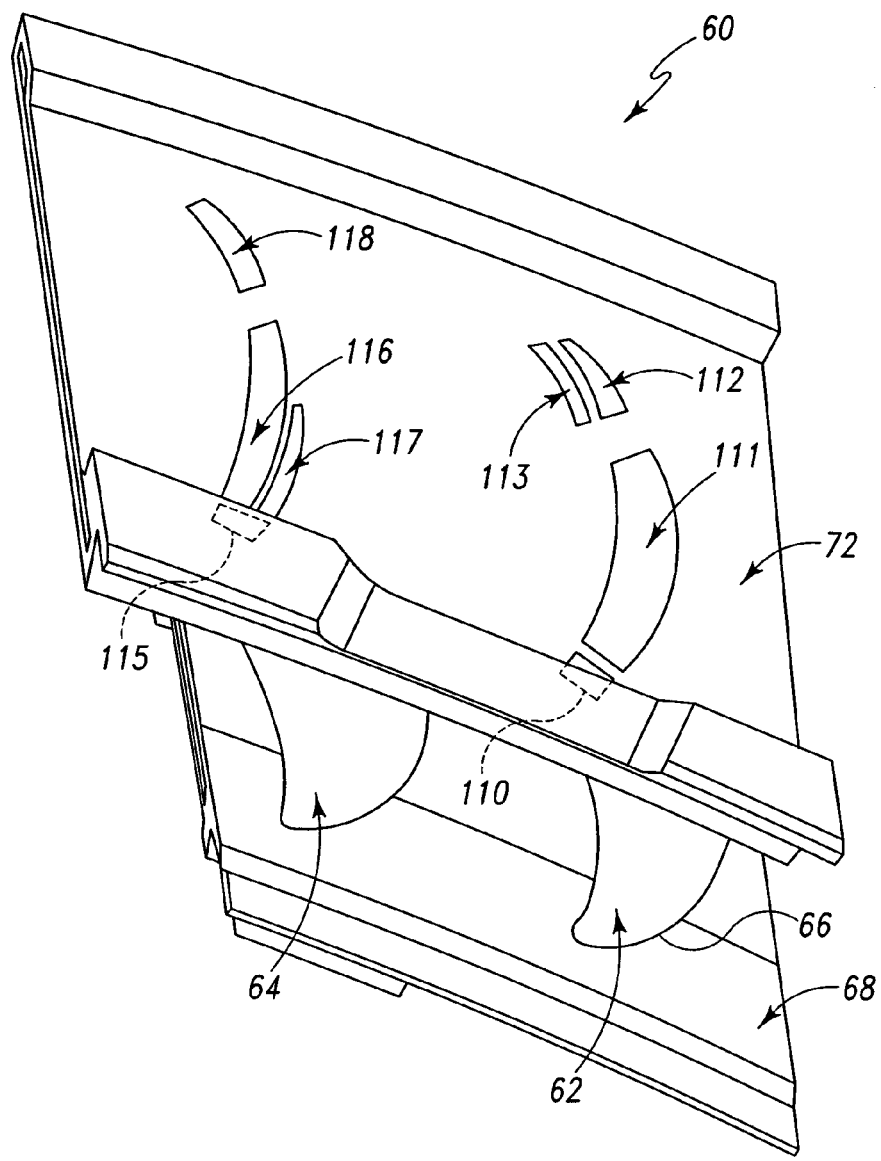
FIG. 3 is a first view of a vane cluster of the ring of FIG. 2.
Figure 4:
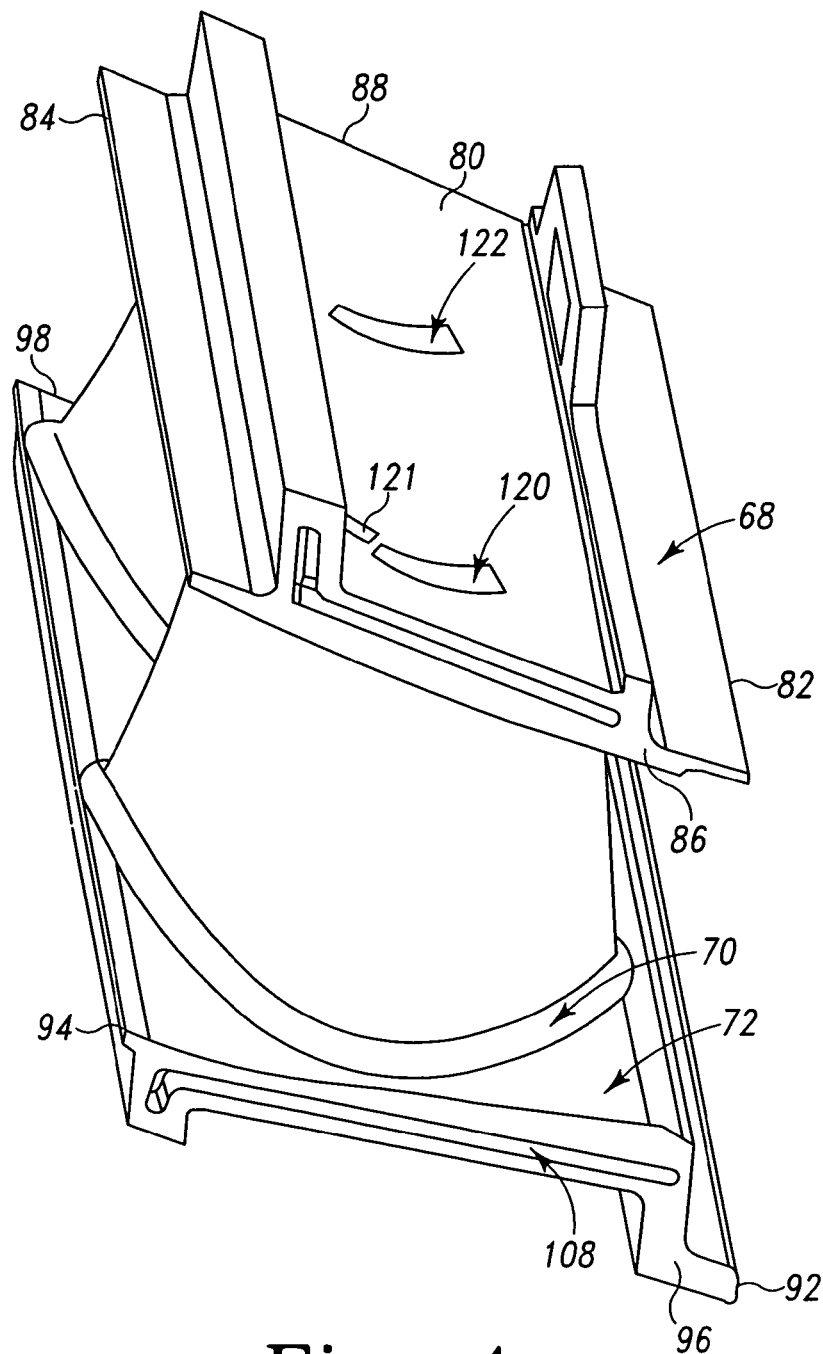
FIG. 4 is a second view of the vane cluster of FIG. 3.

FIGS. 3 and 4 show an exemplary two-airfoil cluster (doublet) 60. Each exemplary cluster includes a first airfoil 62 and a second airfoil 64. Each of the airfoils extends from an associated inboard end 66 at a platform segment 68 to an associated outboard end 70 (FIG. 4) at a shroud segment 72. The exemplary platform segment has an outboard surface 74 along the inboard extreme of the core flowpath. The shroud segment has an inboard surface 76 along an outboard extreme of the core flowpath.

An underside 80 of the platform segment may include features for mounting each platform segment to its adjacent segments (e.g., by bolting to the ring 56). The platform segment has a forward/upstream end 82, a rear/downstream end 84, and first and second circumferential ends or matefaces 86 and 88. Similarly, the shroud segment 72 has an upstream end 92, a downstream end 94, and first and second circumferential ends 96 and 98. Each of the platform circumferential ends 86 and 88 and a shroud circumferential ends 96 and 98 may include a groove or channel 108 for receiving a seal (not shown). A given such seal spans the gap between the adjacent grooves of each adjacent pair of clusters.

The cluster 60 has cooling passageways. An exemplary passageway network may include one or more inlet ports. FIG. 3 shows exemplary inlet ports 110, 111, 112, 113, 115, 116, 117, and 118 (discussed below) in the shroud segment 72. The inlet ports direct cooling air (e.g., bleed air) through one or more spanwise passageway segments in the airfoils 62 and 64. Some of this airflow may exit cooling holes (discussed below) along the airfoils. In the exemplary doublet, a majority of the mass flow of air is discharged thought one or more outlets in the underside of the platform 68. FIG. 4 shows exemplary outlets 120, 121, and 122. The air discharged through the outlets 120-122 may pass downstream to the adjacent blade stage to, in turn, pass through cooling passageways of those blades to cool the blades.

Some of the airflow, however, may be directed to exit the platform through one or more cooling outlet holes (e.g., along the platform outboard surface and the platform circumferential ends).

Figure 5:
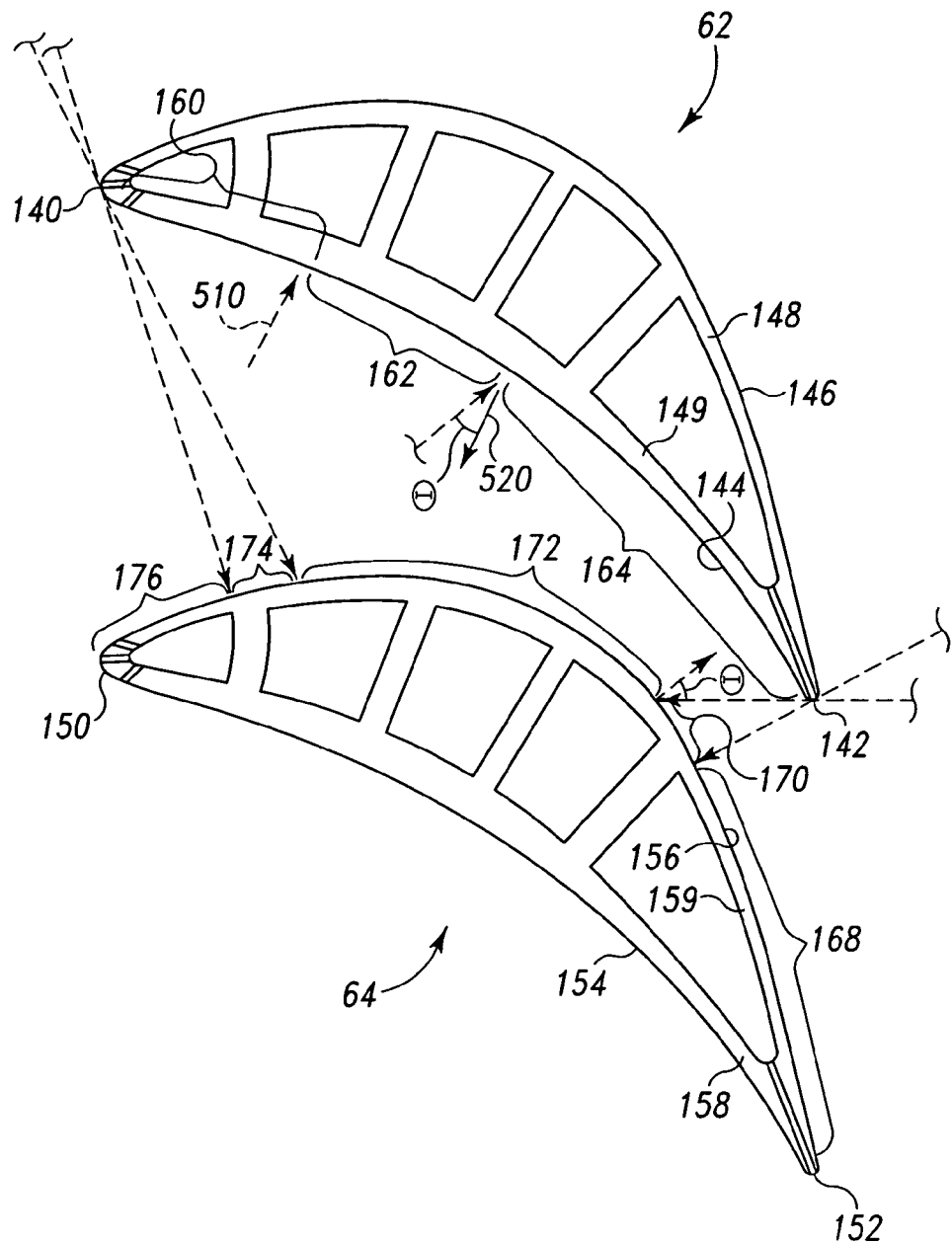
FIG. 5 sectional view of airfoils of a prior art/baseline cluster.

FIG. 5 is a sectional view of the airfoils of a baseline version of a cluster from which the inventive clusters may represent reengineerings. The first airfoil 62 is shown having a leading edge 140, a trailing edge 142, a pressure side 144, and a suction side 146. Pressure and suction side walls are shown as 148 and 149, respectively. Similarly, the second airfoil 64 has a leading edge 150, a trailing edge 152, a pressure side 154, a suction side 156, a pressure side wall 158, and a suction side wall 159. The airfoils also have passageways described below.

After casting, a coating is applied along the airfoils. Exemplary coating techniques are line-of-sight spray techniques (e.g., air plasma spray (APS) and electron beam physical vapor deposition (EBPVD)). Advantageous coating applications are achieved when the spray direction is near normal to the surface being coated. For the first airfoil suction side 146 and the second airfoil pressure side 154, essentially normal line-of-sight flow access is available. However, along portions of the first airfoil pressure side 144 and second airfoil suction side 156 the other airfoil will block normal line-of-sight access. This blocking/occlusion mandates off-normal application with attendant reduction in coating thickness.

Figure 12:
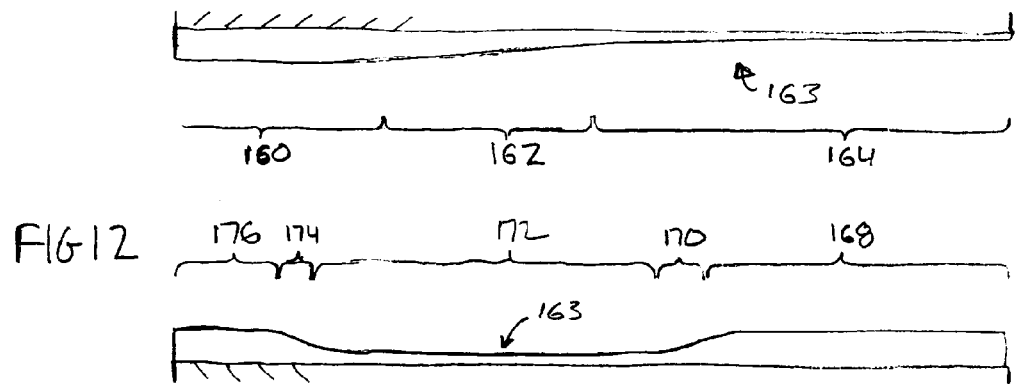
FIG. 12 is a first projected plot of coating thickness for the facing surfaces of airfoils of the cluster.
Figure 13:
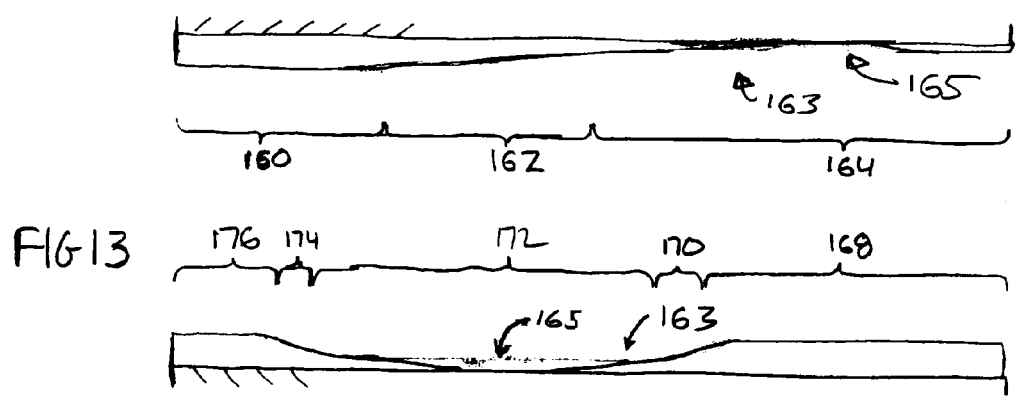
FIG. 13 is a second projected plot of coating thickness for the facing surfaces of airfoils of the cluster.

FIG. 5 shows series of line-of-sight spray directions 510 positioned at boundaries of occlusion by the airfoils. FIG. 5 also shows a local surface normal 520. Along a leading region 160 of the first airfoil pressure side, there is essentially normal or near-normal line-of-sight access. Thus, along this region 160, the coating 161 (FIGS. 12&13) is full thickness. Downstream thereof, the off-normal angle θ increases. There may be progressive degradation of coating thickness producing a local thinning 163 or gap 165. For example, in a region 162 to an angle θ of about 30°, the coating may be deemed marginal. In a region 164 downstream thereof, and with greater θ, the coating may be deemed poor.

Similarly, along a trailing region 168 of the second airfoil suction side 156, the coating may be full-thickness. Along a region 170 thereahead, the coating may be marginal. Along a region 172 yet thereahead, the coating may be poor. Along a region 174 yet thereahead, the coating may be marginal. Along a leading region 176, the coating may be full. The exact distribution of coating quality will be highly dependent upon the particular cluster geometry. The presence of regions of relatively thin coating may locally increase thermal damage. In addition to being affected by coating thickness, the locations of possible thermal damage are influenced by the locations of aerodynamic heating. Thus, a combination of high local aerodynamic heating and local coating thinning 163 and/or gap 165 is disadvantageous. In such regions, it is desirable to add supplemental cooling.

One possible avenue for supplemental cooling would be to add outlets from the existing passageways to the airfoil surface (e.g., film cooling holes). However, the dilution associated with such discharge of air would impact the thermodynamic performance of the engine and counter the advantage that doublets have in reduced intergap air discharge relative to singlets. Furthermore, discharge along the suction side affects aerodynamic performance of the airfoil particularly significantly, thereby impeding turbine performance.

Figure 6:
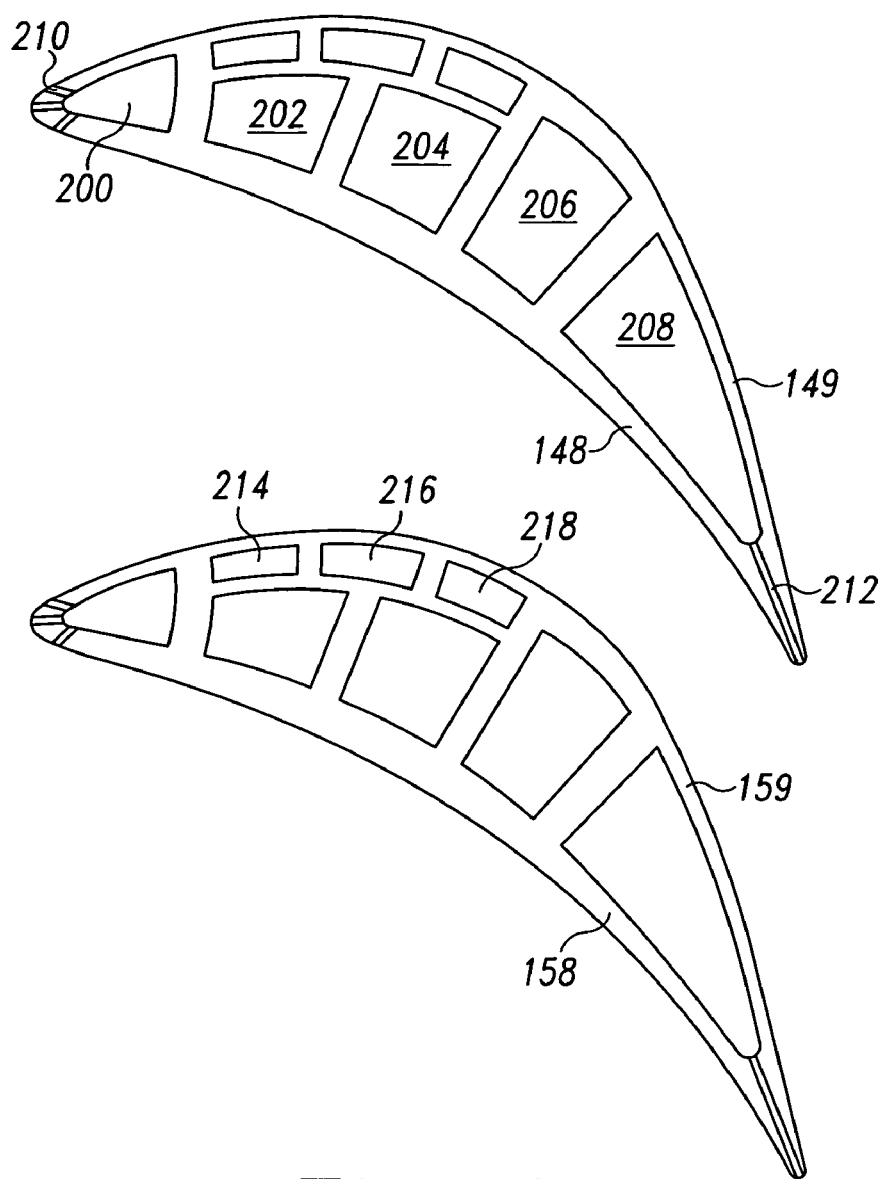
FIG. 6 is a sectional view of airfoils of a first reengineered cluster.

FIG. 6 shows a reengineered cluster (e.g., reengineered from the FIG. 5 baseline) to add supplemental wall cooling (e.g., via adding in-wall circuits). In the exemplary cluster 60, each of the airfoils includes a streamwise array of spanwise-elongate passageway legs: a leading edge feed cavity 200; a first through-flow leg 202; a second through-flow leg 204; a third through-flow leg 206; and a trailing edge feed cavity 208. In the exemplary cluster 60, the leading edge cavity 200 has a closed inboard end and discharges air through spanwise arrays of leading edge outlet holes 210. Similarly, the cavity 208 may discharge through an array of trailing edge outlet holes (or a slot) 212. The through-flow legs discharge through the associated platform outlets to a plenum (not shown) for feeding blade cooling.

The basic arrangement of such passageways may be preserved in the reengineering. However, local wall thickening to accommodate added passageways may correspondingly narrow the adjacent legs/cavities. The exemplary reengineering adds cooling passageways 214, 216, and 218 in the suction side wall 159 of the second airfoil. To permit use of identical casting cores, similar passageways may be added to the first airfoil. In some asymmetric alternatives, the first airfoil could be left unchanged relative to the baseline. In other asymmetric alternatives, the first airfoil (and not the second) could include similar cooling along its region 164. For example, FIG. 7 shows passageways 220, 222, and 224 adjacent a feed passageway 208' (thinned relative to 208) from which an array of outlet holes (or a slot) 212' extends.

Figure 8:
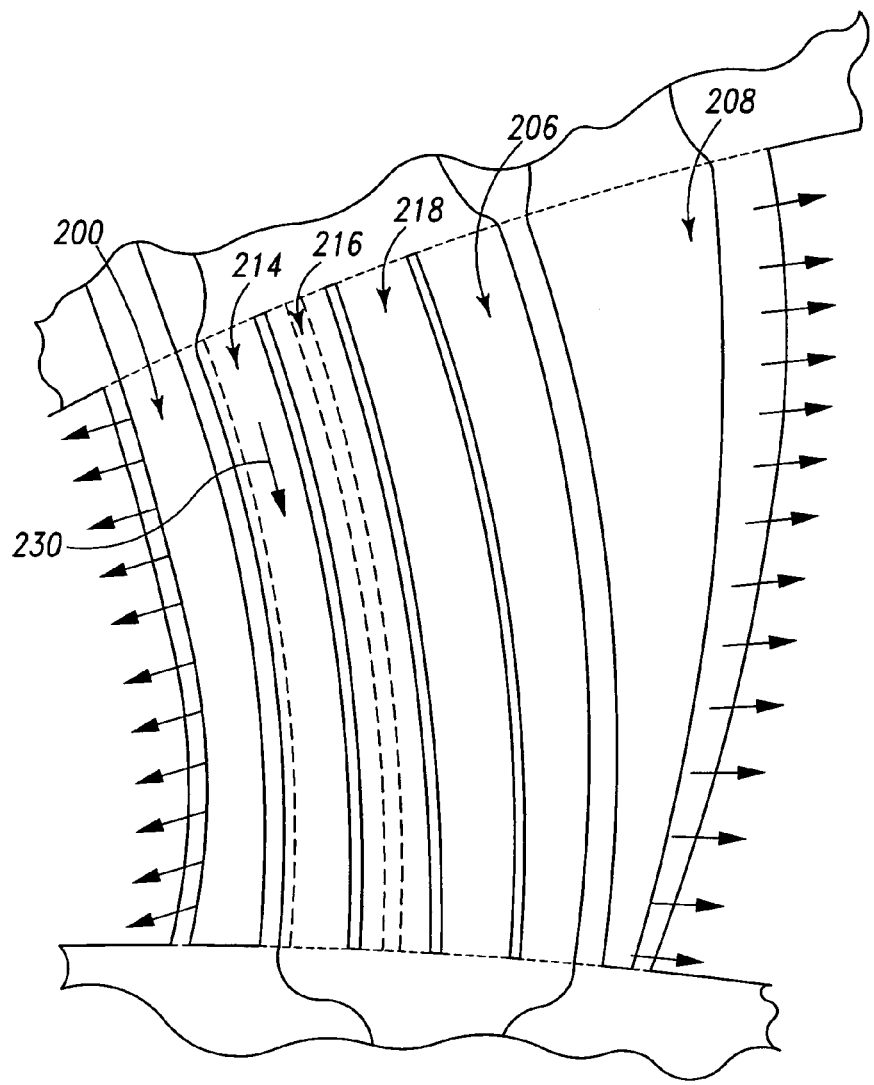
FIG. 8 is a schematic plan view of an exemplary non-serpentine suction side wall cooling circuit of the cluster of FIG. 7.
Figure 9:
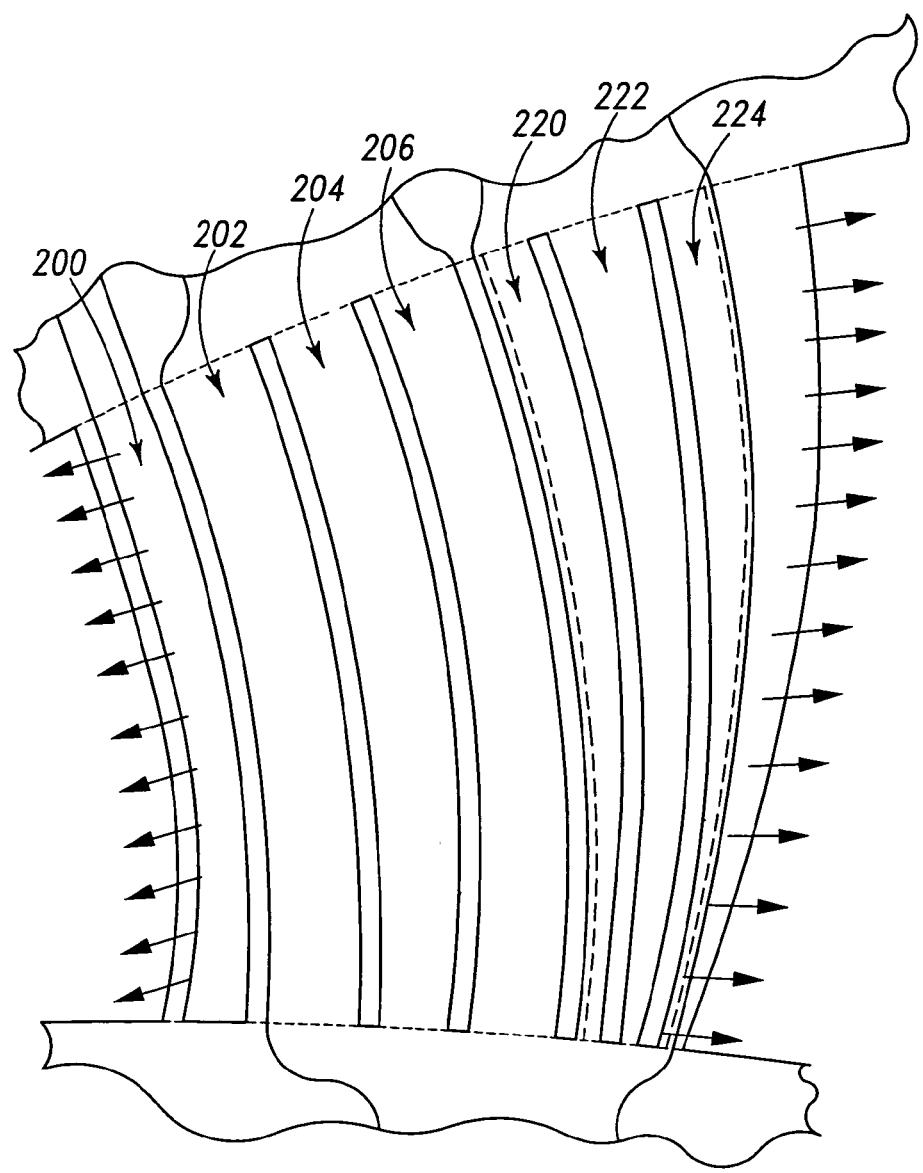
FIG. 9 is a schematic plan view of an exemplary non-serpentine pressure side wall cooling circuit of the cluster of FIG. 7.

FIG. 8 shows an implementation of the added passageways 214, 216, and 218 as discrete, non-interconnected, and non-serpentine upstream-to-downstream arrayed legs. Airflow 230 passes inboard from outboard inlets of the legs and is discharged through the platform outlets without diversion (e.g., via film cooling holes to the suction surface). In an alternative (not shown) with interconnected legs, the overall flow may also enter from the shroud and discharge from the platform. In variations of either embodiment, there may, however, be diversions from this flow (e.g., for film cooling). Similarly, FIG. 9 shows the passageways 220, 222, and 224.

Figure 7:
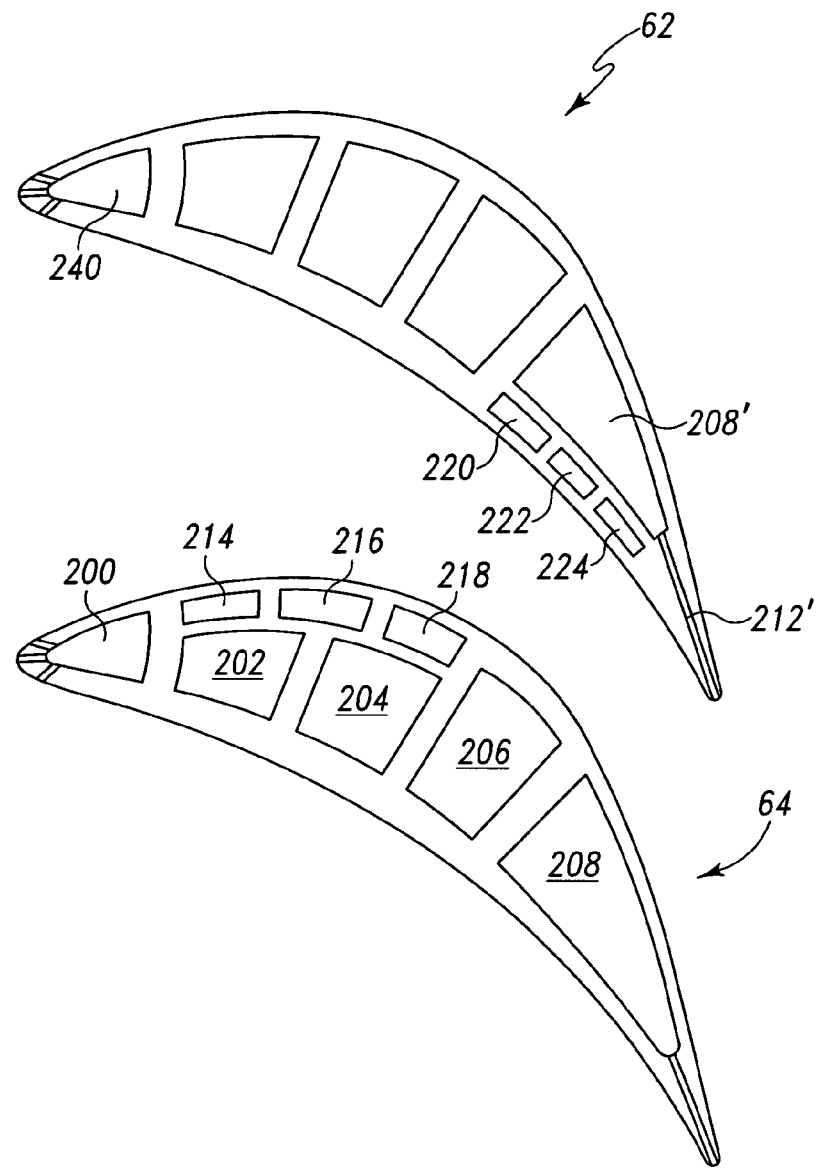
FIG. 7 is a sectional view of airfoils of a second reengineered cluster.

Returning to FIG. 3, the exemplary inlet ports are shown in one exemplary combination corresponding to the passageway positions of FIG. 7. In the exemplary implementation, inlet ports 110 and 115, respectively, feed the lead passageways 200 of the first and second airfoils 62 and 64. The inlet port 111 feeds the next three through-passageways of the first airfoil 62. For the second airfoil 64, the port 111 is replaced with two ports 116 and 117. The port 116 feeds passageways 202, 204, and 206 whereas the port 117 feeds the passageways 214, 216, and 218. Conversely, for the second airfoil 64, the port 118 feeds the trailing feed passageway 208. For the first airfoil 62, the port 118 is replaced by ports 112 and 113 feeding the feed passageway 208' on the one hand and the through-passageways 220, 222, and 224 on the other hand. In the exemplary platform of FIG. 4, the port 122 is positioned to receive the combined flow from the passageways 202, 204, 206, 214, 216, and 218 for the second airfoil 64. For the first airfoil 62, however, the port 120 discharges the flow from the three main through-passageways whereas the port 121 discharges the flow from the added passageways 220, 222, and 224. Where multiple passageways are fed by or feed a single port, an associated plenum structure is defined within the shroud or platform.

Figure 10:
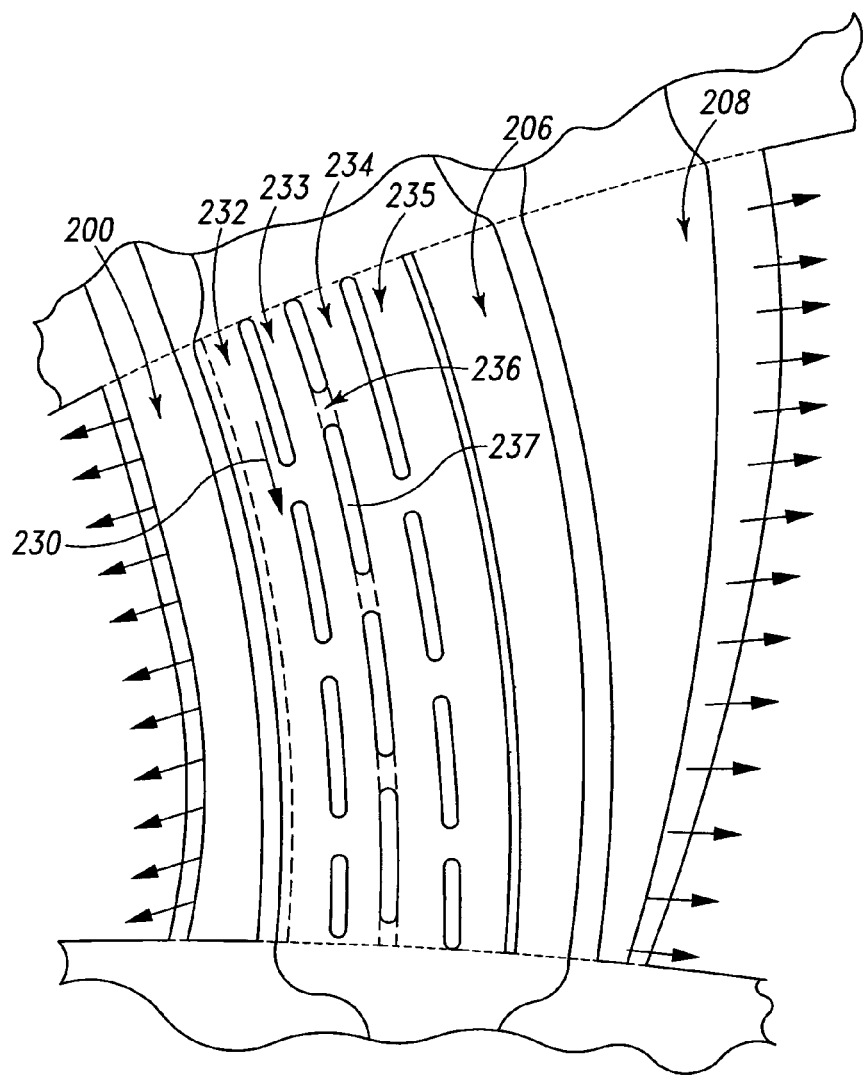
FIG. 10 is a schematic plan view of an exemplary interconnected circuit of the cluster of FIG. 7.

FIG. 10 shows a circuit having legs 232, 233, 234, and 235 interconnected by gaps 236 in the walls 237 separating adjacent legs.

Figure 11:
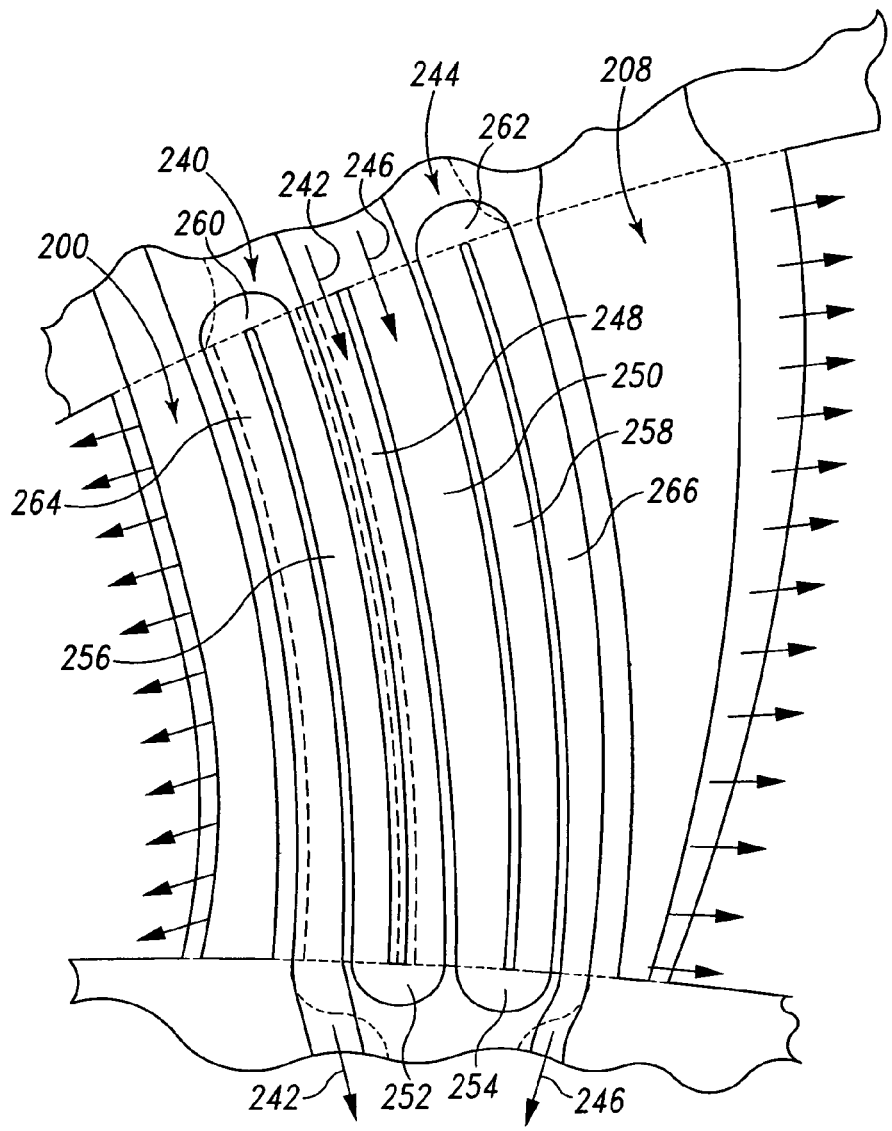
FIG. 11 is a schematic plan view of an exemplary serpentine circuit of the cluster of FIG. 7.

FIG. 11 shows an exemplary two-circuit single serpentine arrangement. A first circuit 240 passes a flow 242 and a second circuit 244 passes a flow 246. The two circuits each have a first downpass leg 248; 250 receiving the flow from one or more inlets (e.g., the inlet 112). Therefrom, the circuits each have an inboard turn 252; 254. Therefrom the circuits each have a backpass leg 256; 258. Therefrom, the circuits each have an outboard turn 260; 262. Therefrom, the two circuits have a final downpass leg 264, 266 discharging the associated flow 242; 246 from an associated outlet in the platform. Relative to the direction of flow over the airfoil, the exemplary direction of the flow 242 is downstream to upstream (e.g., toward the leading edge) while the direction of the airflow 246 is downstream (e.g., toward the trailing edge).

One or more embodiments of the present invention have been described. Nevertheless, it will be understood that various modifications may be made without departing from the spirit and scope of the invention. For example, the principles may be applied in the remanufacturing of an existing engine or the reengineering of an existing baseline engine configuration. In such a remanufacturing or reengineering situation, details of the baseline configuration may influence details of the particular implementation. Accordingly, other embodiments are within the scope of the following claims.

What is claimed is:

1. A vane cluster comprising a coated metallic substrate including:
   a platform;
   a shroud;
   at least first and second airfoils extending between an outer face of the platform and an inner face of the shroud, each airfoil having a pressure side and a suction side, the pressure side of the first airfoil facing the suction side of the second airfoil; and
   a cooling passageway system including one or more first feed passageways in the first airfoil and one or more second feed passageways in the second airfoil,
   wherein:
   at least a first side selected from the pressure side of the first airfoil and the suction side of the second airfoil includes a first region with a local thinning or gap in the coating;
   along said first side, the cooling passageway system includes means for supplementally locally cooling said first region, the means focusing cooling to the first side at the first region;
   the first side is the pressure side of the first airfoil;
   the suction side of the second airfoil includes a second region with a local thinning or gap in the coating;
   along said suction side of the second airfoil, the cooling passageway system includes means for supplementally locally cooling said second region of the second airfoil;
   the means for supplementally locally cooling said first region comprises a first in-wall circuit with flow between the platform and shroud; and
   the means for supplementally locally cooling said second region comprises a second in-wall circuit with flow between the platform and shroud.

2. The cluster of claim 1 wherein:
   there are no additional in-wall circuits with flow between the platform and shroud.

3. The cluster of claim 1 wherein:
   the flows of both the first circuit and second circuit are to the platform from the shroud.

4. The cluster of claim 1 wherein:
   both the first circuit and second circuit are non-serpentine.

5. The cluster of claim 1 wherein:
   both the first circuit and second circuit are serpentine.

6. The cluster of claim 1 wherein:
   the flow of at least one of the first circuit and second circuit is to the platform from the shroud.

7. The cluster of claim 1 wherein:
   at least one of the first circuit and second circuit is serpentine.

8. The cluster of claim 1 wherein:
   at least one of the first circuit and second circuit is non-serpentine.

9. A vane cluster comprising a coated metallic substrate including:
   a platform;
   a shroud;
   at least first and second airfoils extending between an outer face of the platform and an inner face of the shroud, each airfoil having a pressure side and a suction side, the pressure side of the first airfoil facing the suction side of the second airfoil; and
   a cooling passageway system including one or more first feed passageways in the first airfoil and one or more second feed passageways in the second airfoil,
   wherein:
   at least a first side selected from the pressure side of the first airfoil and the suction side of the second airfoil includes a first region with a local thinning or gap in the coating;
   along said first side, the cooling passageway system includes means for supplementally locally cooling said first region, the means focusing cooling to the first side at the first region;
   the first side is the suction side of the second airfoil; and the means for locally cooling said first region comprises a first in-wall circuit with flow between the platform and shroud.

10. The cluster of claim 9 wherein:
the first airfoil has no in-wall circuit similarly-placed to said first in-wall circuit.

11. A method for manufacturing the cluster of claim 9 comprising:
manufacturing a casting by an investment casting process, the casting including precursors of the platform, shroud, first and second airfoils, first and second feed passageways, first and second platform cooling plenums, and the means for locally cooling said first region; and
applying the coating, the as-applied coating having said local thinning or gap.

12. The method of claim 11 wherein:
the investment casting uses first and second feed cores to cast the first and second feed passageways and an additional core for casting the means for locally cooling said first region.

13. A vane cluster comprising a coated metallic substrate including:
a platform;
a shroud;
at least first and second airfoils extending between an outer face of the platform and an inner face of the shroud, each airfoil having a pressure side and a suction side, the pressure side of the first airfoil facing the suction side of the second airfoil; and
a cooling passageway system including one or more first feed passageways in the first airfoil and one or more second feed passageways in the second airfoil,
wherein:
at least a first side selected from the pressure side of the first airfoil and the suction side of the second airfoil includes a first region with a local thinning or gap in the coating; and
along and locally aligned with said first region, the cooling passageway system includes an in-wall portion, the in-wall portion focusing cooling to the first side at the first region and lacking outlet to the first side.

14. A vane cluster comprising:
a platform;
a shroud;
at least first and second airfoils extending between an outer face of the platform and an inner face of the shroud, each airfoil having a pressure side and a suction side, the pressure side of the first airfoil facing the suction side of the second airfoil; and
a cooling passageway system,
wherein:
the cooling passageway system includes:
at least one inlet in the shroud;
at least one first feed passageway from the shroud to the platform through the first airfoil;
at least one second feed passageway from the shroud to the platform through the second airfoil; and
a first in-wall circuit along the suction side of the second airfoil, there not being an in-wall circuit with flow between the platform and shroud along the suction side of the first airfoil.

15. The cluster of claim 14 wherein:
the first in-wall circuit is serpentine.

16. The cluster of claim 14 wherein:
the first in-wall circuit extends between the platform and shroud.

17. The cluster of claim 16 wherein:
there are no passageways from the first in-wall circuit to the suction side of the second airfoil.

18. The cluster of claim 14 further comprising:
an in-wall cooling circuit along the pressure side of the first airfoil.

19. A vane cluster comprising a coated metallic substrate including:
a platform;
a shroud;
at least first and second airfoils extending between an outer face of the platform and an inner face of the shroud, each airfoil having a pressure side and a suction side, the pressure side of the first airfoil facing the suction side of the second airfoil; and
a cooling passageway system including one or more first feed passageways in the first airfoil and one or more second feed passageways in the second airfoil,
wherein:
at least the suction side of the second airfoil includes a first region with a local thinning or gap in the coating; and
along said suction side of the second airfoil, the cooling passageway system includes means for locally cooling said first region, the means for locally cooling said first region comprising a first in-wall circuit, and
the first airfoil has no in-wall circuit similarly-placed to said first in-wall circuit.

20. The cluster of claim 1 wherein:
the first in-wall circuit and the second in-wall circuit each are formed by a cast portion of the cluster.

\* \* \* \* \*